United States Patent
Kithil et al.

[11] Patent Number: 6,014,602
[45] Date of Patent: *Jan. 11, 2000

[54] MOTOR VEHICLE OCCUPANT SENSING SYSTEMS

[75] Inventors: Philip W. Kithil; Michael H. Barron; William C. McIntosh, all of Santa Fe, N.Mex.

[73] Assignee: Advanced Safety Concepts, Inc., Santa Fe, N.Mex.

[*] Notice: This patent is subject to a terminal disclaimer.

[21] Appl. No.: 09/143,636

[22] Filed: Aug. 28, 1998

Related U.S. Application Data

[60] Division of application No. 08/621,465, Mar. 25, 1996, Pat. No. 5,802,479, which is a continuation-in-part of application No. 08/311,576, Sep. 23, 1994, Pat. No. 5,602,734, and a continuation-in-part of application No. 08/535,576, Sep. 28, 1995, Pat. No. 5,691,693.

[51] Int. Cl.$^7$ .................................................. B60R 21/32
[52] U.S. Cl. .............................. 701/45; 701/46; 280/735; 180/272
[58] Field of Search ................................. 701/45, 46, 47; 280/734, 735; 180/272; 324/658, 687

[56] References Cited

U.S. PATENT DOCUMENTS

| | | |
|---|---|---|
| 3,473,824 | 10/1969 | Carey et al. . |
| 3,664,682 | 5/1972 | Wyceh . |
| 3,740,567 | 6/1973 | Atkins . |
| 3,752,501 | 8/1973 | Daniel et al. . |
| 3,863,209 | 1/1975 | Hollins . |
| 3,864,668 | 2/1975 | Bickford . |
| 3,894,750 | 7/1975 | Eckels . |
| 3,898,472 | 8/1975 | Long . |
| 3,900,210 | 8/1975 | Lohr et al. . |
| 3,917,023 | 11/1975 | DeRosa . |
| 3,949,357 | 4/1976 | Hosaka . |
| 3,964,016 | 6/1976 | Yamada et al. . |
| 4,006,918 | 2/1977 | MacFarland . |
| 4,130,298 | 12/1978 | Shaunnessey . |
| 4,166,641 | 9/1979 | Okada et al. . |
| 4,169,613 | 10/1979 | Barnett . |
| 4,271,454 | 6/1981 | Knobl et al. . |
| 4,320,766 | 3/1982 | Alihanka et al. . |
| 4,536,008 | 8/1985 | Brown, Jr. . |
| 4,573,706 | 3/1986 | Breed . |
| 4,620,721 | 11/1986 | Schlotz et al. . |

(List continued on next page.)

FOREIGN PATENT DOCUMENTS

| | | |
|---|---|---|
| 1 946 607 | 3/1971 | Germany . |
| 40 00 903 C1 | 8/1990 | Germany . |
| WO92/08947 | 5/1992 | WIPO . |

OTHER PUBLICATIONS

Novak et al., "A Capacitance–Based Proximity Sensor for Whole Arm Obstacle Avoidance", IEEE May 1992, pp. 1307–1314.
Brede, D., et al., "A Complete Frontal Crash Sensor System–1," Automotive Technologies Int'l, Inc. 930650, pp. 119–125 and 1331–132 (Mar. 19930.
Fakhar, et al., "Effect of Sound and Vibrations on Vigilance," Laboratorie Energie Nuisances (LEN), (France) INRETS No. 153, pp. 90–92 (192) (Translated).
Jost, K., Editor, "Headliner–Mounted Presence Detector," Automotive Engineering, p. 99 (May, 1996).
Novak, J.L., et al., "A Capacitance–Based Proximity Sensor for Whole Arm Obstacle Avoidance,"Proc. IEEE Int'l Conf. On robotics and Automation, pp. 1307–1314 (May, 19920.
Smythe, "Static & Dynamic Electricity," Capacitors, Dielectrics, Systems of Conductors. Textbook, p. 38 (1950).

Primary Examiner—Tan Nguyen
Attorney, Agent, or Firm—Jeffrey D. Myers

[57] ABSTRACT

A roof-mounted passenger position sensor array of capacitive coupling passenger position sensors, to determine position and motion of a passenger by analysis of distances of the passenger to the various sensors of the array and analysis of the changes of distances with time.

9 Claims, 9 Drawing Sheets

U.S. PATENT DOCUMENTS

| | | | |
|---|---|---|---|
| 4,625,329 | 11/1986 | Tshikawa et al. . | |
| 4,700,973 | 10/1987 | Gademann et al. . | |
| 4,796,013 | 1/1989 | Yasuda et al. . | |
| 4,832,287 | 5/1989 | Werjefelt . | |
| 4,842,301 | 6/1989 | Feldmaier . | |
| 4,866,418 | 9/1989 | Dobler et al. . | |
| 4,885,566 | 12/1989 | Aoki . | |
| 4,887,024 | 12/1989 | Sugiyama et al. . | |
| 4,887,066 | 12/1989 | Marek . | |
| 4,908,574 | 3/1990 | Rhodes et al. . | |
| 4,980,519 | 12/1990 | Vranish et al. . | |
| 4,985,835 | 1/1991 | Sterler et al. . | |
| 5,002,308 | 3/1991 | Lenzen et al. . | |
| 5,034,891 | 7/1991 | Blackburn, et al. . | |
| 5,058,921 | 10/1991 | Cuevas . | |
| 5,071,160 | 12/1991 | White et al. . | |
| 5,074,583 | 12/1991 | Fujita et al. . | |
| 5,118,134 | 6/1992 | Mattes et al. . | |
| 5,119,901 | 6/1992 | Buie . | |
| 5,145,208 | 9/1992 | Hoagland et al. . | |
| 5,152,550 | 10/1992 | Hoagland et al. . | |
| 5,166,679 | 11/1992 | Vranish et al. . | |
| 5,166,820 | 11/1992 | Vollmer . | |
| 5,232,243 | 8/1993 | Blackburn . | |
| 5,240,283 | 8/1993 | Kishi et al. . | |
| 5,247,261 | 9/1993 | Gershenfeld . | |
| 5,256,904 | 10/1993 | Tohbaru et al. . | |
| 5,261,506 | 11/1993 | Jost . | |
| 5,281,921 | 1/1994 | Novak . | |
| 5,282,646 | 2/1994 | Melvin et al. . | |
| 5,291,014 | 3/1994 | Brede et al. . | |
| 5,311,877 | 5/1994 | Kishi . | |
| 5,330,226 | 7/1994 | Gentry et al. | 280/735 |
| 5,353,226 | 10/1994 | Estrada . | |
| 5,366,241 | 11/1994 | Kithil . | |
| 5,370,677 | 12/1994 | Rudie et al. . | |
| 5,383,646 | 1/1995 | Weingarten . | |
| 5,398,185 | 3/1995 | Omura . | |
| 5,400,487 | 3/1995 | Gioutsos et al. . | |
| 5,404,128 | 4/1995 | Ogino et al. . | |
| 5,413,378 | 5/1995 | Steffens, Jr. et al. . | |
| 5,429,893 | 7/1995 | Thomas . | |
| 5,431,438 | 7/1995 | Manabe . | |
| 5,436,187 | 7/1995 | Tanigane . | |
| 5,436,188 | 7/1995 | Chen . | |
| 5,439,249 | 8/1995 | Steffens, Jr. et al. . | |
| 5,440,157 | 8/1995 | Imai et al. . | |
| 5,446,661 | 8/1995 | Gioutsos et al. . | |
| 5,460,999 | 10/1995 | Hong et al. . | |
| 5,468,013 | 11/1995 | Gille . | |
| 5,482,314 | 1/1996 | Corrado et al. | 307/10.1 |
| 5,494,311 | 2/1996 | Blackburn et al. . | |
| 5,508,953 | 4/1996 | Fukuda et al. . | |
| 5,510,989 | 4/1996 | Zabler et al. . | |
| 5,525,843 | 6/1996 | Howing . | |
| 5,548,474 | 8/1996 | Chen et al. . | |
| 5,551,288 | 9/1996 | Geraldi et al. . | |
| 5,602,734 | 2/1997 | Kithil | 701/45 |
| 5,653,462 | 8/1997 | Breed et al. | 180/272 |
| 5,702,123 | 12/1997 | Takhashi et al. | 280/735 |
| 5,770,997 | 6/1998 | Kleinberg et al. | 340/438 |
| 5,785,347 | 7/1998 | Adolph et al. | 280/735 |
| 5,845,000 | 12/1998 | Breed et al. | 382/100 |

MOTOR VEHICLE OCCUPANT SENSING SYSTEMS

CROSS-REFERENCE TO RELATED APPLICATIONS

This application is a divisional of U.S. Ser. No. 08/621,465 (filed on Mar. 25, 1996, issuing as U.S. Pat. No. 5,802,479 on Sep. 1, 1998, which is a continuation-in-part application of U.S. patent application Ser. No. 08/311,576, entitled "Automobile Airbag System", to Philip W. Kithil, filed on Sep. 23, 1994, issued as U.S. Pat. No. 5,602,734 on Sep. 1, 1998, and of U.S. patent application Ser. No. 08/535,576, entitled "Impaired Vehicle Operator System", to Philip W. Kithil, filed on Sep. 28, 1995, issuing as U.S. Pat. No. 5,691,693 on Nov. 25, 1997, the teachings of both of which are incorporated herein by reference.

BACKGROUND OF THE INVENTION

1. Field of the Invention (Technical Field)

The present invention concerns systems for sensing characteristics of motor vehicle occupants for purposes such as deployment of air bags during vehicle crashes. More particularly it concerns systems in which the system operation is affected not only by information about the motion of the vehicle caused by crash forces, including angular acceleration, but also measured data concerning the motion of the passenger, so that the system will operate in a manner to minimize the risk of serious injury to the passenger, and will not operate when the air bag deployment would not likely be beneficial.

2. Background Art

Automobile air bag systems are a well known means of attempting to reduce the likelihood of serious injury to passengers in collisions. These systems are designed to very quickly inflate an air bag in front of a passenger during a collision, so as to hopefully prevent the passenger from colliding with hard objects in the passenger compartment interior, particularly the steering column and/or the dashboard. Such systems typically sense that the vehicle is involved in a collision, by using an accelerometer to sense sudden deceleration of the vehicle. Rapid inflation of the air bag may be obtained by electrical ignition of a pyrotechnic substance which rapidly generates a volume of gas sufficient to inflate the air bag, or by electrical opening of a valve for release of compressed gas stored in a chamber which is part of the air bag system.

The performance of an air bag system, in terms of its success or failure in preventing serious passenger injury, may be critically dependent on facts concerning the initial position and subsequent motion of the passenger, which are not made known to the system by an accelerometer which senses deceleration of the vehicle as a whole. Passenger head motion is particularly important, due to the seriousness of head injuries. For example, if the passenger is seated too far forward, or has his/her head too far forward, occupying the space into which the air bag will deploy, the passenger may be seriously injured by the deployment of the air bag intended to prevent passenger injury. So there is clearly a need for passenger position sensing apparatus, which can prevent air bag deployment when the passenger is already too far forward when the collision begins.

But even if the passenger is not too far forward at the beginning of the collision, the passenger will tend to move rapidly forward, with the passenger's head leading that motion, relative to the vehicle, as the vehicle rapidly decelerates, and will tend to move into the air bag deployment space, at least in the case of forward collisions, and may be too far into the air bag deployment space, before the completion of air bag deployment, to escape injury from the air bag deployment. There are a number of factors which may strongly influence the forward motion of the passenger, in addition to initial position, in ways which may vary markedly from one passenger to another. The relative forward motion of the passenger will depend strongly on whether the passenger has secured a seat lap belt and/or shoulder harness prior to the collision. The passenger's motion may also be influenced somewhat by the strength of any tensing up reaction the passenger has to the collision, i.e., instinctively pushing forward with the feet against the floorboard to restrain forward motion of the body. Such a protective reaction may vary greatly from one passenger to another, and may be greatly reduced or wholly absent if the collision is too sudden, so that the passenger has no time to react, or if the passenger is intoxicated or otherwise impaired. Also variation of the crash intensity by itself will cause considerable variation in passenger acceleration. So there is a need for systems which measure the position vs. time of the passenger, particularly head motion, and analyze that information in making the yes or no decision on air bag deployment. Although systems are known which measure passenger motion, as described in documents filed with applicant's Information Disclosure Statement, applicant is not aware of such a system employing an overhead array of capacitive coupling proximity sensors, as in the present invention, to continuously determine passenger position by triangulation, and determine passenger acceleration by means of a microprocessor which analyzes signals indicative of passenger distance from each sensor of the array, and changes of said distances with time. Overhead sensors offer an advantage over those previously known systems having beam—emitting sensors located in front of the passenger, as in air bag systems with acoustic sensors mounted on the steering column, for which the beam from the sensor will at times by blocked from operating by the hands and/or forearms of the driver.

The use of an array of capacitive coupling proximity sensors offers advantages over beam—emitting sensors, in an air bag system, since each capacitive coupling sensor functions by sensing the change in the capacitance of a capacitor, caused by the nearby presence of a person, an effect which is essentially instantaneous (since propagated at light speed), rather than requiring a finite, non—negligible beam travel time as in the case of an ultrasonic position sensor, and since the capacitive coupling sensor does not require transmission and detection of a beam which might be blocked. And the use of the overhead array of capacitive coupling proximity sensors, the signals from which are analyzed by the microprocessor, allows essentially instantaneous and continuous monitoring of passenger position and motion through triangulation based on the distances of the passenger to the various sensors of the array, so that the overhead sensor array can be used to accurately and continuously determine fore—aft, diagonal, and lateral passenger motion. Since the passenger's head will be closest to the overhead sensors, this method will be particularly sensitive to passenger head motion.

The present invention also addresses a need for an air bag system sensitive to angular vehicle acceleration, for both crash confirmation purposes and also to prevent air bag deployment in the case of a vehicle rollover, in which case air bag performance may be unreliable and deployment is undesirable. This need is met through use of a three axis vehicle rollover sensor, the output of which is analyzed by the microprocessor.

The present invention also addresses a need for an air bag system that will provide protection against injury of a forwardly positioned passenger, which might otherwise be caused by the air bag deployment, in particular an infant sitting in a conventional rear—facing infant car seat, conventionally positioned with the child's head rather far forward, where the child may suffer a serious head injury during air bag deployment. As detailed below, this need is met by the provision of an air bag which, when inflated and deployed, has two principal chambers with a reentrant slot between them, which slot can accommodate the infant in the car seat, and which geometry allows deflection of the rearmost of the two chambers by the car seat and infant, to reduce the force of impact with the passenger and thus reduce the risk of such an injury.

Since the design of automotive air bag systems continues to evolve, as more knowledge is gained about the dynamics of crashes, including problems associated with variations in passenger motion during a crash, there is a need, for crash investigation purposes, for a system which can record the vehicle and passenger motion during the crash process, particularly passenger head motion. This need is met by the present invention, through the provision of recording means in the microprocessor connected to the sensors which detect vehicle and passenger motion.

SUMMARY OF THE INVENTION (DISCLOSURE OF THE INVENTION)

The present invention is of a roof—mounted motor vehicle air bag system, having, as principal components: a roof—mounted array of capacitive coupling passenger position sensors, for continuously sensing passenger position, especially head motion, by means of triangulation analysis of distances from the passenger to various sensors of the array; a rollover sensor for continuously monitoring all three vehicle axis orientations; a microprocessor, for analysis and brief recording of outputs of the passenger position and rollover sensors, and generation of a signal for air bag deployment, also having in its memory several data bases which are tables of values representative crash-related parameters, further described below; a pyrotechnic gas generator means for air bag inflation, upon receipt of the firing signal from said microprocessor; and a multi—chamber air bag, intended for passenger use (though the other components of the present invention could also be used with driver, side, or rear seat air bag systems), having two principal chambers, separated by a reentrant reaction surface, with one chamber positioned for deployment, on inflation, along the inner surface of the vehicle windshield, and the other principal chamber deploying to the rear of the first, and with the rear most of the two chambers being deflectable by a forwardly positioned occupant such as an infant in a rear—facing child car seat of the kind customarily placed in a forward position, which car seat would lie within the slot formed by reentrant reaction surface, to reduce the risk of passenger injury from air bag deployment. The passenger position sensors are proximity sensors, which are capacitors with associated circuitry to continuously monitor the effect on the capacitance value caused by the presence of a person in the vicinity, which effect is dependent on the distance from the person to the sensor. By use of an oscillator and signal processing circuitry the preferred embodiment monitors the changes in the capacitive coupling effect with suitable sampling frequency, so that the array can be used to measure movement of a passenger. The microprocessor is programmed to deploy the air bag if the sensor data, as compared with a crash confirmation data base table, indicates a crash (this data base table contains data, for comparison purposes, on normal motion which would not be indicative of a crash, e.g. head motion from a sneeze); however the microprocessor is programmed to not issue a firing signal if either: comparison of occupant position and velocity data from the passenger position sensor array, with "no fire" data base figures in tables showing air bag position during deployment, indicates that the occupant would interfere with the deploying air bag; or if a likely vehicle rollover is indicated by the microprocessor's comparison of data from the rollover sensor with tables of values indicating a vehicle rollover, or if data from the rollover sensor indicates that angular vehicle acceleration is insufficient to indicate a collision; or the sensor data indicates that the passenger's motion would not be restrained by the air bag, because of the direction of motion of the passenger caused by the crash, e.g. in a crash with substantial lateral crash force components, causing substantial lateral passenger motion.

The invention is of a method of and apparatus for disabling an airbag system for a seating position within a motor vehicle, the airbag system comprising an airbag door, comprising: providing to a roof above the seating position one or more capacitive coupling occupant sensors; detecting presence or absence of an occupant of the seating position using the one or more capacitive coupling occupant sensors; disabling the airbag system if the seating position is unoccupied; detecting proximity of an occupant to the airbag door if the seating position is occupied; and disabling the airbag system if the occupant is closer to the airbag door than a predetermined distance. In the preferred embodiment, modifying airbag deployment parameters to adjust inflation force of the airbag according to proximity of the occupant to the airbag door is included. Two capacitive coupling sensors may be used, and detecting proximity is done by providing voltage output values of the capacitive coupling sensors to a data processor and comparing the voltage output values against predetermined values to determine occupant position. Preferably, one capacitive coupling sensor is forward of the midpoint of the seating position and one aft of the midpoint.

The invention is also of a motor vehicle air bag system for inflation and deployment of an air bag in front of a passenger in a motor vehicle during a collision, the motor vehicle having a passenger compartment for at least one passenger in the motor vehicle, the passenger compartment having an interior roof and a passenger seat for the passenger, the air bag system comprising: an air bag; inflation means connected to the air bag for inflating the air bag with a gas; passenger sensor means, mounted adjacent to the interior roof, for continuously sensing position of the passenger with respect to the passenger compartment, and for generating electrical output indicative of the position of the passenger; analog processor means, electrically connected to the passenger sensor means and to the inflation means, for comparing and performing an analysis of the electrical output from the passenger sensor means, and for activating the inflation means to inflate and deploy the air bag when the analysis indicates that the vehicle is involved in a collision and that deployment of the air bag would likely reduce a risk of serious injury to the passenger which would exist absent deployment of the air bag and likely would not present an increased risk of injury to the passenger resulting from deployment of the air bag.

The invention is further of a capacitive coupling sensor array comprising a first sensor having a first geometry and a second sensor having a second geometry, the first and second sensors being placed such that equipotential lines of the first and second sensors overlap. In the preferred embodiment, the first and second geometries are circular, oval, square, rectangular, triangular, or polygonal of greater than four sides. The sensor array is preferably mounted proximate a roof of a motor vehicle, a long axis of the first sensor is perpendicular to a long axis of the second sensor, the first geometry is rectangular and the second geometry is oval, and the first sensor is rearward of the second sensor in the motor vehicle.

The invention is additionally of a vehicle occupant sensing system comprising one or more capacitive coupling sensors, the sensors comprising a receive electrode and a drive electrode, the receive electrode placed within the drive electrode such that a spacing between edges of the receive electrode from the drive electrode is non-homogenous, the sensors generating equipotential field lines of non-uniform curvature. In the preferred embodiment, the sensors are mounted proximate a roof of a motor vehicle.

The invention is also of a vehicle occupant sensing system comprising one or more capacitive coupling sensors, the sensors comprising a flexible circuit board adhered and electrically contacted to a flexible connector. Preferably, the sensors are mounted on a curvilinear portion of a roof of a motor vehicle.

The invention is further of a dynamically variable capacitive coupling sensor comprising at least three electrodes in a concentric arrangement, each of the electrodes being sequentially configurable as a drive electrode, grounded gap, and receive electrode. Preferably, the sensor is mounted proximate a roof of a motor vehicle and is comprised by an occupant sensing system of the motor vehicle.

The invention is also of, in a roof-mounted, occupant capacitive coupling sensor system, a method of and apparatus for determining characteristics of an occupant's head, comprising: providing more than three fringe field capacitive coupling sensors to a roof of a motor vehicle; for each sensor, determining proximity of the head by means of the sensor's fringe field; and determining from the proximities to each sensor an approximate center and orientation of the head. In the preferred embodiment, an approximate diameter of the head is determined by initially assuming an approximate diameter and then iteratively refining the approximate diameter by determinations of position of the head employing a subset of the sensors. Approximating body mass from head position and dimensions may be performed if desired.

The invention is also of a roof-mounted capacitive coupling occupant sensing system comprising circuitry for determining an average rather than an instantaneous position of an occupant of a motor vehicle. Preferably, the circuitry comprises a time delay circuit (e.g., an astable multivibrator), and the time delay circuit comprises a device for disabling reporting of a condition unless the condition has existed for a predetermined period of time.

The invention is further of an apparatus for determining and analyzing characteristics of a motor vehicle seating position occupiable by an occupant, the apparatus comprising a roof-mounted capacitive coupling sensor array and circuitry for performing a function by means of the array. The functions covered by the invention include: providing a record of head acceleration of the occupant; notifying authorities of a total number of occupants in the motor vehicle; controlling heating and cooling systems of the motor vehicle; controlling sound systems of the motor vehicle; recording seat occupancy over time; automatically adjusting side-mirrors; automatically adjusting seat position; automatically adjusting a seat headrest; providing an alarm if an occupant occupies the seat position for more than a predetermined period of time without a key being in an ignition device of the motor vehicle; and automatically adjusting position of a sighting device.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

(BEST MODES FOR CARRYING OUT THE INVENTION)

Referring now to the drawings, in which like reference numbers denote like or corresponding elements, the principal components of the roof—mounted air bag system of the present invention, are a position sensor array 10 of capacitive coupling proximity sensors 12, a rollover sensor 14, a microprocessor 16 (which may be analog or digital or a hybrid thereof), a gas generator means 18, and an air bag 20, each further discussed below.

Figure 1:
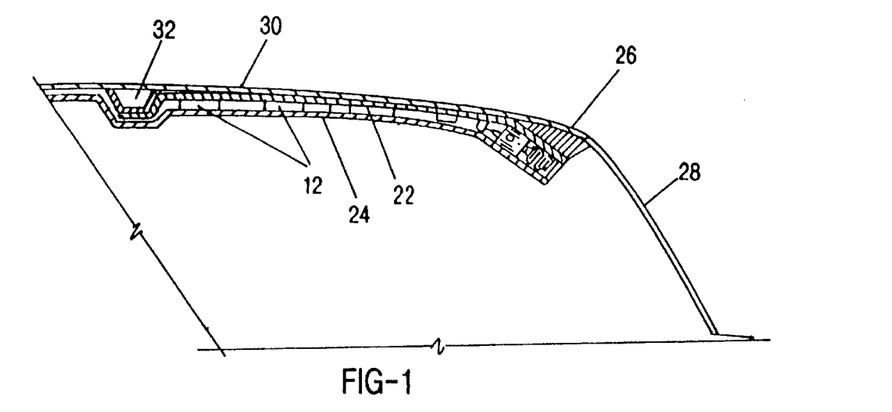
FIG. 1 is a side elevational view of the system of the present invention, partially in section.

The components of the system are attached to a mounting plate 22 above the headliner 24 which is held in place against the passenger cabin roof by edge molding, adhesives, and/or fasteners. The mounting plate 22 is secured by bolts or other secure attachment means at its front end, to the windshield header 26, a part of the vehicle used to attach the windshield 28 to the forward edge of the vehicle roof 30. The mounting plate 22 is firmly secured at its rear end, e.g., by bolts or welding, to a cross brace 32, a standard brace which extends transversely across the interior of vehicle roof 30.

Figure 3:
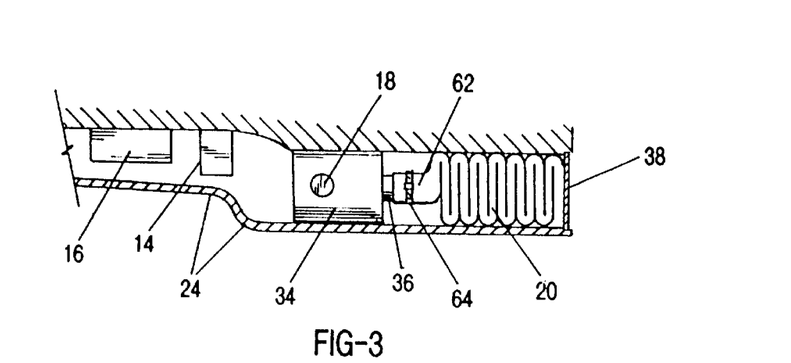
FIG. 3 is an expanded view of the portion of FIG. 1 showing the folded air bag, prior to deployment.

The gas generator means 18 is housed within a manifold 34, which manifold is firmly secured, e.g., by bolts or welding, to mounting plate 22. The gas generator means 18 conveys gas to air bag 20 through a gas nozzle 36. As shown in FIG. 3, air bag 20 is compactly folded above headliner 24, when not inflated and deployed. The headliner 24 has a thin breakaway or door portion 38 below air bag 20, to allow deployment of air bag 20 during a collision.

The proximity sensors 12 forming the position sensor array 10 may be attached to mounting plate 22, or embedded in headliner 24.

The rollover sensor 14, adjacent to position sensor array 10, is securely attached, e.g., by screws, to mounting plate 22. The microprocessor 16 is also securely attached to mounting plate 22. Electric power for operation of microprocessor 16, may be obtained by running wires 40 down one of the A—pillars 42, as shown, or alternatively by running the wires 40 to the dome lamp (not shown). A backup power supply may be a battery 44 and/or a capacitor 46, also attached to mounting plate 22. The air bag system is covered by headliner 24, which is an insulating and cosmetic material such as foamboard, urethane composites, etc., which is securely attached by adhesive or by edge molding structures or other secure means to the inner surface of vehicle roof 30, and to mounting plate 22.

Figure 7:
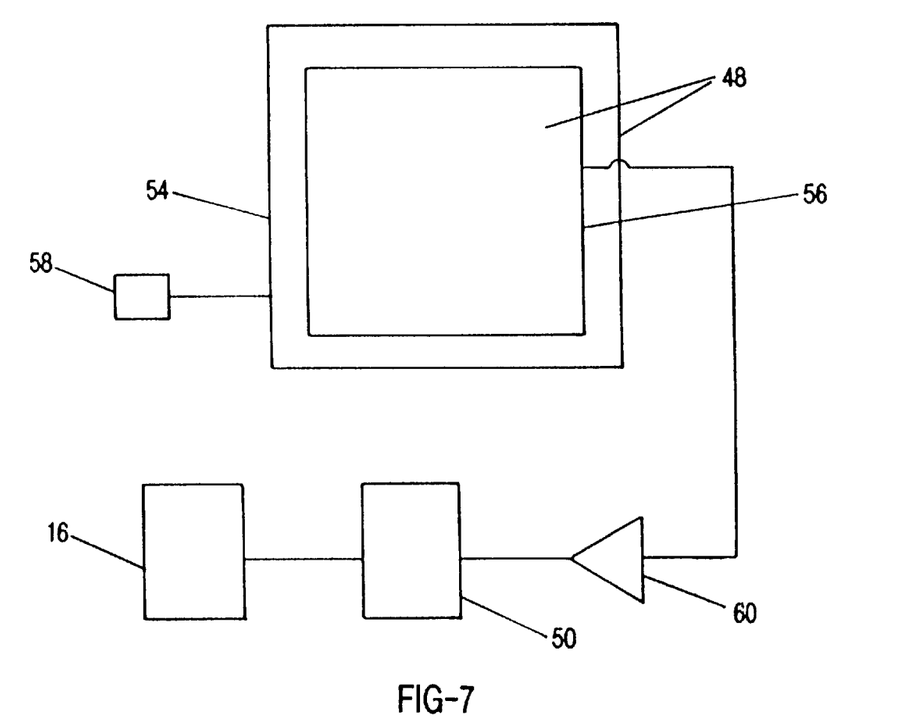
FIG. 7 shows the detector element and also schematically shows the signal processing circuit, which together form one of the proximity sensors of the preferred embodiment.
Figure 8:
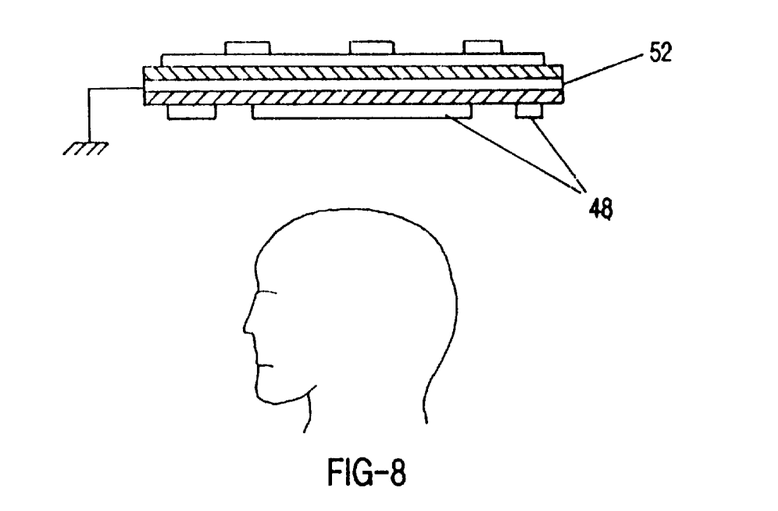
FIG. 8 shows a side elevational view of one of the proximity sensors, above the head of a passenger.

Each of the proximity sensors 12 consists of both a detector element 48, and a signal processing circuit 50, which are best illustrated in FIG. 7. The detector element 48 consists of at least two conductors on one side of a printed circuit board 52, shown in the particular embodiment of FIG. 7 as an oscillator input loop 54, and detector output loop 56. The proximity sensors 12 each function by creating an electrostatic field between oscillator input loop 54 and detector output loop 56, which is affected by presence of a person near by, as a result of capacitive coupling, due to the fact that the human body has conductivity and a dielectric constant different from those of air. Thus there is a change in the capacitance between oscillator input loop 54 and detector output loop 56, caused by the presence of a person nearby. As is well known in the electronic arts, such a capacitive coupling effect will be dependent on the distance from the person to sensor 12. The measured capacitance change may thus be used to determine the distance of the person from sensor 12. The purpose of the signal processing circuit 50, with oscillator 58 and charge—sensitive amplifier 60, is simply to continuously monitor the capacitive coupling effect, and changes in the magnitude of the effect, so that the microprocessor 16 will continuously receive signals from each of the proximity sensors 12, indicative of passenger position. The signals will be particularly sensitive to passenger head position and head motion, since the head is closest to the overhead position sensor array 10. The oscillator 58 is operated at a frequency of the order of 100 kHz, and signal processing circuit 50 will sample at 10 kHz, which is adequate for continuous rapid sampling of the capacitive coupling effect, and changes therein.

Figure 2:
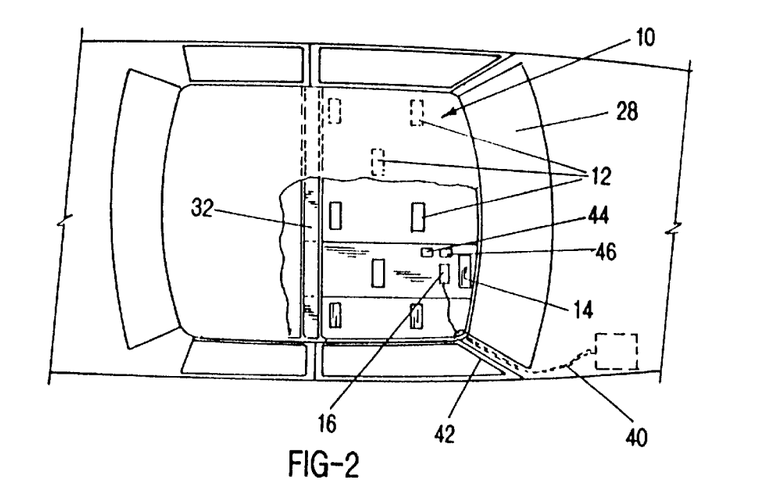
FIG. 2 is a plan view, showing the array of capacitive coupling proximity sensors.

The sampling rate for signal processing circuit 50 may be determined by means contained within microprocessor 16, such as a conventional analog-to-digital converter circuit if the microprocessor operates digitally. The signal processing circuit 50 may consist of a conventional full wave rectifier and a conventional peak detector, connected in series. The position sensor array 10 is an array of the proximity sensors 12 having both longitudinal and lateral extension, as best shown in FIG. 2. An array of one detector every 6" to 12" is believed to be suitable, i.e., the array above a passenger consisting of 4 to 8 detectors depending on the vehicle. An array for bench seats may require more detectors than an array for bucket seats, due to greater variation in occupant position in the seat. The array is used for passenger position determination, as explained below.

The rollover sensor 14 is an electronic 3—axis compass, having three electrical outputs indicative of rotation of rollover sensor 14 about each of its axes. The output signals from rollover sensor 14 are sent to inputs of microprocessor 16 by wires (not shown), so that microprocessor 16 may continuously analyze data regarding components of angular vehicle acceleration.

The microprocessor 16 is programmed to perform the following functions. At startup of the vehicle ignition, which turns on power to microprocessor 16, the microprocessor 16 turns on power to each of the proximity sensors 12 of position sensor array 10, and to rollover sensor 14. The microprocessor 16 continuously monitors the distance of the effective electronic center of a passenger from each of proximity sensors 12, by comparing the capacitive coupling effect produced in each of proximity sensors 12, with a lookup table containing capacitive coupling effect correlations to distance, stored in the memory of the microprocessor 16. By triangulation from the distances of the passenger to the three closest proximity sensors 12 of position sensor array 10, the microprocessor 16 continuously computes and updates the passenger position, as the output signals from each of proximity sensors 12, continuously driven by oscillator 58, are continuously received and analyzed by microprocessor 16. The memory of microprocessor 16 is of a size sufficient to contain the most recent 50,000 passenger positions, corresponding to about five seconds of sensing (at the 10 kHz. sampling frequency of oscillator 58), after which newer data overwrites previously recorded data. Thus the microprocessor 16 will contain a detailed record of passenger position during the last five seconds before a crash, and will continue to record data for five seconds after the crash, which will be quite useful for later crash analysis purposes. Air bag deployment will stop the erasure of old data.

The microprocessor 16 memory also contains passenger head motion lookup tables of threshold acceleration values which may be used to distinguish lesser acceleration motions which often occur in non—collision conditions, e.g., head motion from a sneeze.

The microprocessor 16 is programmed to make a preliminary decision for deployment of air bag 20, if 30–50 or more successive passenger position data points in the memory show an increasing passenger acceleration, and if comparison of this passenger motion data with the parameters in the passenger motion crash parameter lookup tables, indicates a collision. However, the microprocessor 16 is also programmed to override the preliminary decision for air bag deployment, under several different and alternative circumstances:

The microprocessor 16 also simultaneously computes the projected passenger motion during air bag deployment, using the same 30–50 most recent passenger position data points, and thus determines the likely average position of the passenger during the early expansion phase of air bag deployment. The microprocessor 16 compares this position to a "no fire" lookup table contained in the memory of the microprocessor, containing representative positions (three dimensional coordinates) which would be occupied by air bag 20 after initiation of deployment, during its early expansion phase, i.e., from the initial stored position until air bag 20 has extended down to the top of the dashboard (passenger air bag) or to the midpoint of the steering wheel (driver air bag). The microprocessor 16 is programmed to override the preliminary decision for air bag deployment, if the projected average passenger position during air bag deployment is within the "no fire" zone, or too close—within some chosen safety margin distance.

The microprocessor 16 also continuously samples the signals from the rollover sensor 14, reflecting rotation of the x, y, or z vehicle axes. The rollover sensor 14 transmits this data to microprocessor 16 at a rate of 5 kHz. and this data is sampled and recorded at a rate of about 20%, or 1 data point per millisecond. The microprocessor 16 is programmed to override an initial decision for air bag deployment, based on analysis of the signals from rollover sensor 14, in two situations. First, the angular acceleration data for the sampled data points, is compared with data stored in the memory of microprocessor 16 in a "rollover therefore cancel" lookup table, which table has values of axial accelerations indicative of a vehicle rollover. If this comparison indicates that the vehicle will likely roll over from the present collision, air bag deployment is canceled, because air bag performance is unpredictable and possibly harmful in a vehicle rollover; for instance, the occupant could be propelled into the roof rather than forward into the steering wheel or dashboard. Second, the same data points of angular acceleration are compared with a "crash confirmation" table stored in the memory of microprocessor 16, having minimum values of angular accelerations which are indicative of true collisions. If the angular acceleration for the three axes is less than these lookup table values, air bag deployment is cancelled. In other words, at least one of the measured angular accelerations must exceed the corresponding minimum value in order for deployment to occur.

If the preliminary decision for air bag deployment is not overridden by the microprocessor 16, in one of the ways explained above, the microprocessor 16 initiates deployment of air bag 20, by sending an electrical signal to the gas generator means 18.

In certain vehicles, it may be preferable to employ analog circuitry to geometrically determine head position, allowing virtually instantaneous derivations of head velocity and acceleration. Because digital microprocessors are relatively slow for complex trigonometric functions, a data throughput of approximately one millisecond may be insufficient for airbag triggering in high speed crashes. By using analog computing circuitry, the data throughput is much greater, providing thousands of data points per millisecond. This data rate is comparable to the operating rates of micromachined accelerometers, yet relies on actual measurements of the occupant rather than a remote sensing device to activate the airbag. This can improve reliability and airbag deployment timing. As an example, signal processor 50 can output voltage signals from each sensor to analog circuit 16 which transforms each voltage to a distance, which is further processed in analog form to geometrically determine head position. This is expressed as three voltages representing a position in space. This head position can be time-stepped to derive head velocity and acceleration. Use of analog circuitry makes analog/digital conversion unnecessary, and eliminates the need for a digital microprocessor to perform the geometric algorithm and re-convert the results back to analog form of x,y,z coordinates. The only requirement for digital conversion may be for brief storage of data, which can be accomplished with custom digital circuit and FIFO storage devices.

The gas generator means 18 is a means to rapidly generate a large volume of gas for inflation of air bag 20, in response to an electrical signal from microprocessor 16. Preferably this is accomplished through ignition by squibs (not shown), triggered by the firing signal from microprocessor 16, of a pyrotechnic gas generation mixture contained within two gas generator chambers connected to air bag 20 by a single gas nozzle 36. The inflation of air bags by gas generated through burning of pyrotechnic mixtures, which may be ignited electrically by one or more squibs, is an air bag inflation method well known in the art, as described for example in the patent on the invention of Cuevas, U.S. Pat. No. 5,058,921, describing combustion chambers 32 and 34 containing a mixture of sodium azide and copper oxide, ignited by a squib 36. Col. 6, lines 56–68; FIG. 2; Col. 7, lines 37–41; and the patent on the invention of White et al, U.S. Pat. No. 5,071,160, describing air bag inflation by a plurality of pyrotechnic—activated gas generating cartridges 44. Col. 5, lines 22–37. Said disclosures of said patents are incorporated herein by this reference.

The air bag 20 of the present invention is a multi—chamber air bag having a deployed configuration which is intended to reduce the risk of serious injury to a forwardly positioned passenger, specifically including an infant who may be forwardly positioned in a conventional rear—facing child car seat. The design also provides enhanced cushioning effects to reduce the risk of occupant injury.

Figure 4:
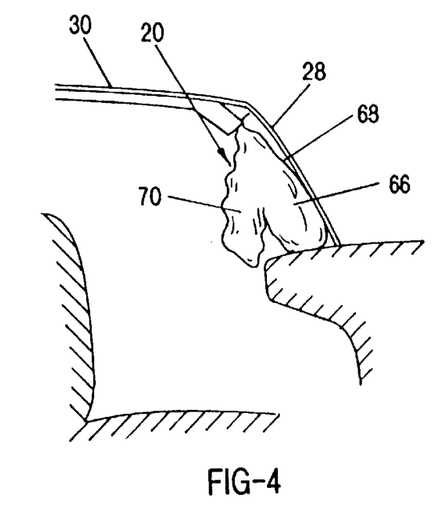
FIG. 4 is a side elevational view showing the air bag in a partially inflated configuration.
Figure 5:
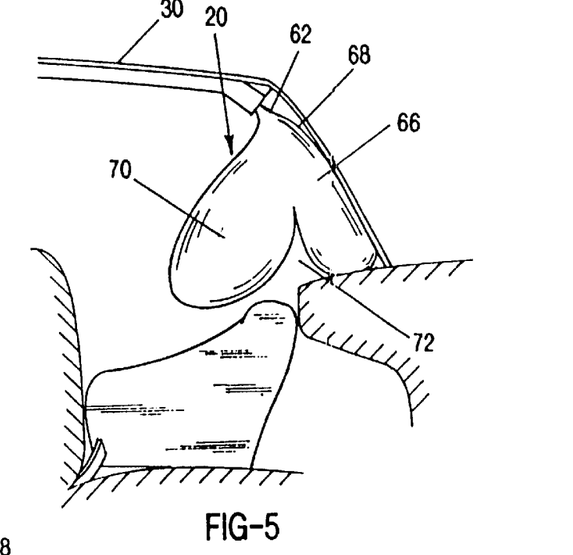
FIG. 5 is a side elevational view showing the air bag in a fully inflated configuration, and also showing a rear—facing infant car seat.
Figure 6:
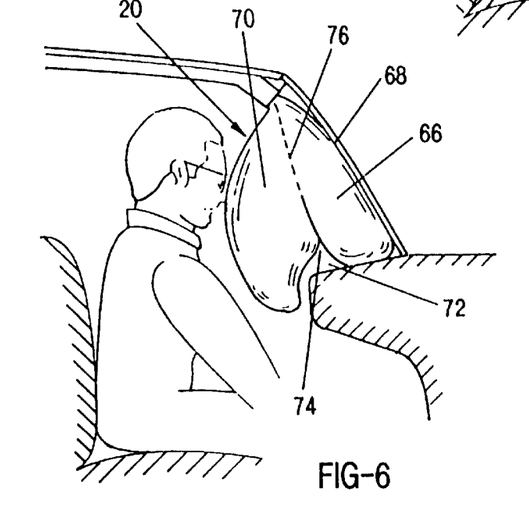
FIG. 6 is a side elevational view showing the air bag in a fully inflated configuration, and also showing an adult passenger.

The air bag 20 has a first chamber 62, forming a neck which extends around gas nozzle 36, to which first chamber 62 is securely attached by a suitable clamp 64, or other suitable attachment means. The air bag 20 is configured to form, on inflation, two principal chambers, a forward chamber 66, which inflates downward with its forward surface 68 extending downward along windshield 28, and a rear chamber 70. A reentrant notch 72, of the form of an inverted V, is formed by a reentrant reaction surface 74, the portion of the surface of air bag 20 joining forward chamber 66 and rear chamber 70. The reentrant notch 72 is maintained, against the tendency of the gas pressure to erase it by forcing downward the juncture between forward chamber 66 and rear chamber 70, by means of an tether 76 within air bag 20, which attaches the top of air bag 20 to the juncture between forward chamber 66 and rear chamber 70.

This geometry tends to reduce the risk of injury to an infant in a rear—facing car seat, or other forwardly positioned passenger, since this passenger can fit within notch 72 between forward chamber 66 and rear chamber 70, and since the body of a forwardly positioned passenger, even if sufficiently far back as to be struck by rear chamber 70, can deflect rear chamber 70 upward, so as to reduce the impact on the passenger from the collision with the air bag 20.

The air bag design also provides an enhanced cushioning effect, since there is a sequential flow of the gas from first chamber 62, to forward chamber 66 and thence to rear chamber 70. Gas may be vented through one or more orifices (not shown) in air bag 20, or if a porous fabric is used in fabrication of air bag 20, some of the gas may seep out of the pores, thereby providing a soft cushioning effect.

Those familiar with the art will appreciate that the invention may be employed in configurations other than the specific forms disclosed herein, without departing from the essential substance thereof.

For example, and not by way of limitation, other forms of capacitive coupling proximity sensors could be used, other than the specific form disclosed herein, provided only that the sensor element has a capacitance between two of its electrodes, and that the sensor circuit is able to measure changes in said capacitance caused by capacitive coupling effects of the head of the passenger. Or the means for calculating passenger position and acceleration could use the elements disclosed in applicant's prior patent application Ser. No. 08/130,089, filed Sep. 30, 1993, entitled "AUTOMOBILE AIR BAG SYSTEM", e.g., at page 11, line 25–page 12, line 10.

It would of course not be necessary to use a squib—fired pyrotechnic mixture for the gas generation means; one could instead employ a pressurized gas container, with an electrically operated valve activated by a firing signal from the microprocessor.

Similarly the invention is not to be regarded as being limited to any particular choices of the spacing dimensions of the proximity sensors 12 in position sensor array 10; or of the sensor operating rates or sampling rates; or of mounting methods inside headliner 24, or particular methods of attachment to the roof structure; or to the use of a particular vehicle linear accelerometer as part of the crash confirmation process, such as Analog Devices ADXL50, rather than the three-axis angular accelerometer.

Further desirable construction and orientations of the capacitive sensors are next described. The precise construction and orientation may be varied to achieve desired results for particular vehicles.

One manner in which to determine occupant position is to use two sensors providing voltage output to the microprocessor, representing the capacitive coupling effect of the occupant's position relative to each sensor. The microprocessor can compare these voltages against known values indicating occupant zone position, without referring to a voltage-distance translation function. This configuration is particularly useful for vehicles having inadequate roof space for an array of three or more sensors. Also, because sensor response diminishes exponentially with distance, triangulation methods to determine the position of a small person whose head is located farther from the roof-mounted sensor array may yield incorrect data. Because the logic and software algorithm to generate zone position needed by a dual sensor array is simpler than a triangulation algorithm, the dual sensor array can provide more reliable zone positioning at far range, compared to the triangulation algorithm. The latter, which requires data from three sensors, outputs an error condition if the occupant moves out of range of one of the sensors.

Figure 22:
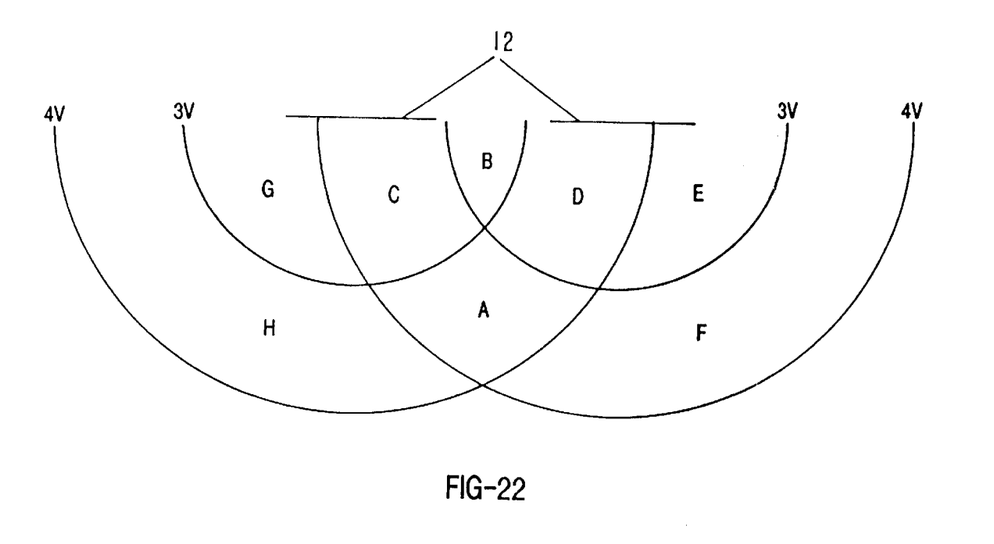
FIG. 22 is a side view of possible zones and voltages created by fore and aft sensors having overlapping field further described by Table I.

Referring to FIG. 22, the two sensors 12 are mounted in the headliner above each seat, positioned parallel to the longitudinal axis of the vehicle, i.e., one forward and one aft of the seat midpoint. Because the sensing fields overlap, extending downward approximately 20" from each sensor, multiple zones are created, consisting of voltage responses to a human occupant from each of the two sensors. A table of possible zones created by various sensor responses are shown and depicted below:

TABLE I

| Zone | Aft Sensor ID | Volts | Fore Sensor ID | Volts | Airbag System Inflator Level |
|---|---|---|---|---|---|
| A | far | 3 to 4 | far | 3 to 4 | 3 |
| B | close | <3 | close | <3 | 3 |
| C | close | <3 | far | 3 to 4 | 4 |
| D | far | 3 to 4 | close | <3 | 2 |
| E | out | >4 | close | <3 | 1 |
| F | out | >4 | far | 3 to 4 | off |
| G | close | <3 | out | 3 to 4 | 5 |
| H | far | 3 to 4 | out | >4 | 5 |

The zones, voltages, and airbag system response can be varied to suit the requirements of the vehicle dimensions and airbag system parameters.

Figure 9:
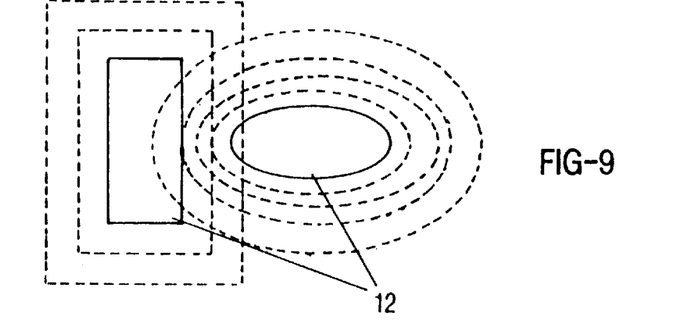
FIG. 9 is a plan view of an arrangement of a "breadloaf" and an oval sensor with overlapping field.
Figure 10:
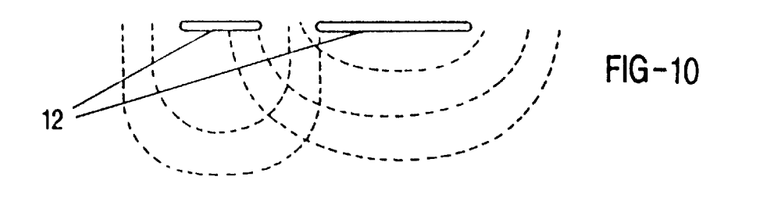
FIG. 10 is a side view of the arrangement of FIG. 9.

The zoning concepts achieved with two sensors are feasible for a variety of sensor geometries, including round, rectangular, and polygon-shaped sensors. By use of non-round sensors, the sensing fields can be tailored in shape to match the dimensions of most positions of a seated occupant, including upright or fully reclined seatback, seat positioned full forward or aft, and occupant resting against the door or window. The approximate sensing fields for two exemplary detector shapes 12 are depicted in FIGS. 9 and 10.

Because the equipotential field lines for a round sensor are hemispheric, the use of this shape in the front seat of a vehicle may result in the field lines infringing on the side window and front windshield, or extending behind the front seat. Because the sensor is responsive to water and "sees through" glass, a heavy rain storm could possibly cause a false signal. Or, if the field lines extend behind the front seat, a rear-seated occupant could cause an unwanted sensor response. Therefore, it is desirable to shape the equipotential field lines so they more nearly match the preferred interior dimensions of the front passenger area, with minimal infringement on glass areas or into the rear seat. This can be accomplished by using a rectangular or "breadloaf" shaped sensor in combination with an oval or round sensor, installing each in such a manner that the equipotential lines are constrained to the likely positions of a front seat passenger's head, as shown in FIGS. 9 and 10. Such an arrangement provides a field shape consistent with fore-aft seat travel and seatback recline, while minimizing the likelihood of false response caused by water on the windshield or side window.

Preferably, the two shapes are juxtaposed so that long axis of one is 90 degrees offset from the long axis of the other.

As may readily be understood, various combinations of round, square, breadloaf, oval, and polygon-shaped detectors can be utilized depending on the sensing volume requirements. Also, the juxtapositioning of two sensors can be arranged in various manners to achieve the desired result.

Optimum occupant sensing by roof-mounted capacitive coupling sensors requires matching the sensing field volumes to the interior volume of the passenger compartment. A means to improve the coincidence of these volumes is to vary the spacing between the drive and receiving electrodes of the capacitive coupling sensors, resulting in a skewing of equal potential sensing field lines. The sensing field thus can be configured to better fit the passenger compartment and to detect an occupant in all possible seating positions.

Figure 11:
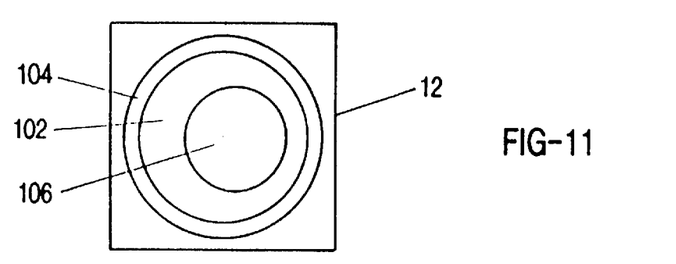
FIG. 11 is a plan view of a non-homogenous capacitive coupling sensor electrode configuration.
Figure 12:
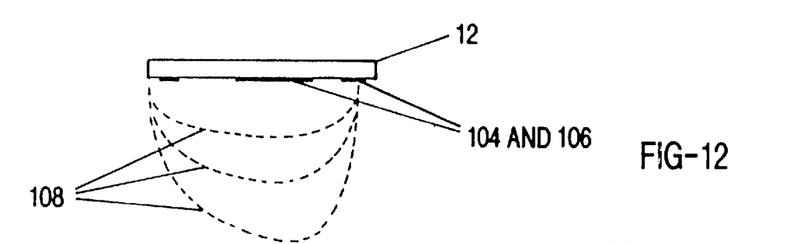
FIG. 12 is a side view of the configuration of FIG. 11.
Figure 20:
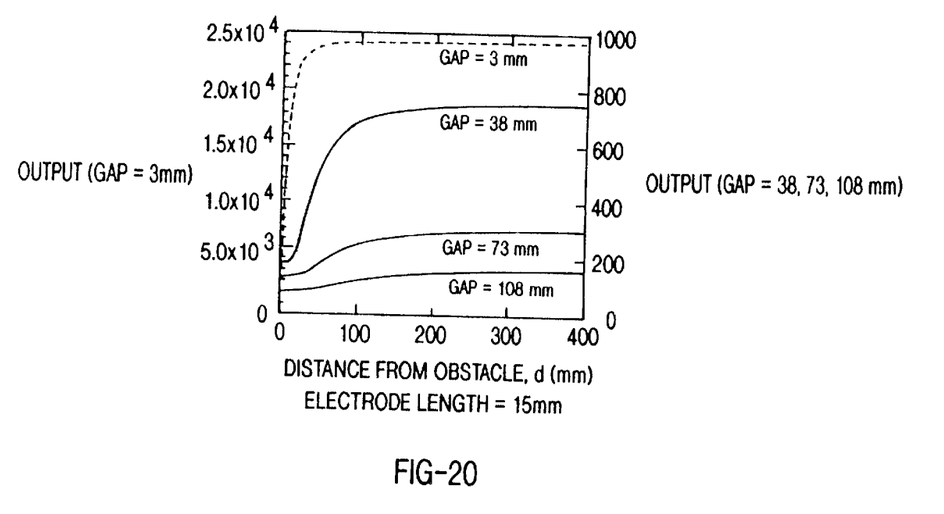
FIG. 20 is a plot of sensor response for various electrode spacings useful in assisting configuration of a non-homogenous capacitive coupling sensor electrode such as that of FIGS. 11 and 12.

An occupant sensing system must be responsive to the passenger occupying a wide variety of seating positions resulting from the many seat adjustments possible. This responsiveness can be enhanced by utilizing non-homogeneous spacing of sensor electrodes, which create equal potential field lines that are skewed to match the desired volume of the passenger compartment. An exemplary non-homogeneous electrode spacing 102 for a round sensor 12 comprising drive electrode 104 and receive electrode 106 is depicted in FIGS. 11 and 12, generating equal potential field lines 108. Sensor response for various electrode spacings are known, as shown in FIG. 20, which can assist in determining proper non-homogenous electrode configuration for a given vehicle and desired result.

Sensor designs incorporating flexible circuit boards and integrated flex cables may be used to improve the fit of a fringe field capacitive sensor onto the curved portion of a roof headliner, to improve the reliability of the sensor by integrating the connecting cable into the top layer of the multi-layer circuit board, and to properly connect grounded layers of the multi-layer circuit board, enabling proper functioning of the capacitive sensor. A rigid sensor circuit board installed on a curved roof surface requires special adhering techniques which are not optimum considering the life expectancy of vehicles, the possible heat buildup in the roof, and modern high speed assembly requirements. Therefore, it is advantageous to produce the sensor using flexible circuit board materials, thus allowing the sensor to follow the curvilinear shape of the roof, at least in the major dimension of roof curvature.

Furthermore, connectors which physically connect cables or wires to circuit boards are often subject to stress and vibration, which may cause the connection to come loose. Therefore, it is desirable to integrate the cable by using a continuous layer of flex circuit board material as the cable, extending this flex layer as the top layer of the multi-layer circuit board. This layer can be produced as a "daughter" board, meaning it is populated with various active components, integrated circuits, etc., which are integrated electronically with the underlying layers of the flex sensor circuit board. This design improves reliability and reduces cost.

Flex circuit boards are typically produced in single and double-sided configurations. Electrically connecting two double sided flex boards is difficult because the flexibility causes intermittent disconnect of the connecting circuit pads. Or, if the pads are slightly separated, a capacitor is created, with unpredictable results on the signals. In the present sensor design, it is necessary to connect the top and bottom layers while avoiding any connection between the middle layers.

Figure 13:
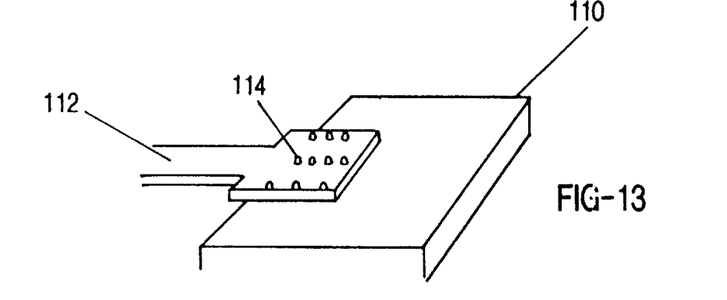
FIG. 13 is a perspective view of a flexible circuit board sensor with integrated flex cable.
Figure 14:
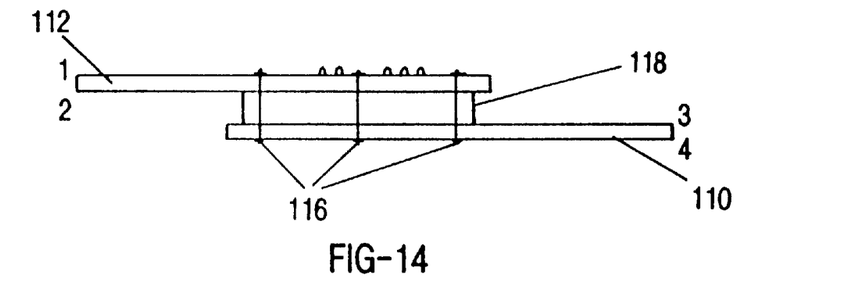
FIG. 14 is a side view of the configuration of FIG. 13.

The preferred flex sensor design 110, showing the integrated flex cable 112 incorporating active components 114, is shown in FIGS. 13 and 14. The technique for connecting two double-sided flex circuit boards is shown in FIG. 14. In this illustration, sides 1 and 2 are interconnected using conventional surface mount design, as are sides 3 and 4. To connect side 1 to side 4, matching holes are drilled through both layers, but these holes are insulated from the circuitry on layer 2 by providing the holes with insulative "doughnuts" (not shown). Then, after the two layers are adhered by adhesive and dielectric layer 118, rivets 116 are inserted through the holes, and the rivets 116 are mushroomed, thus permanently connecting the flexible cable 112 and the flexible circuit board 110. This simultaneously electrically connects side 1 and sides 3 and 4, accomplishing the necessary connections. The rivets can be accomplished with any conducting material, using a variety of connecting devices such as solder, threaded attachments, and the like. The flex sensor and integrated cable can be in a geometry other than rectangular or circular, and the sensor can incorporate non-homogeneous electrodes and electrode spacing.

It is known that increasing electrode spacing affects sensor response. A smaller electrode spacing results in a sharper transition in the voltage/distance function. Therefore, sensors with multiple concentric electrodes that sequentially can be electronically connected to the drive electrode, disconnected and grounded, or connected to the receiving electrode, can generate a range of voltage responses for any given detector and target object. The additional data generated by dynamically varying the sensor geometry can improve discrimination of the target. In the case of the human head as target, multiple sensors using this process can help determine head orientation, size, and shape, all of which can be used to tailor the output of "smart" airbag systems. The resulting varying sensor outputs can be processed to determine additional information about objects, including humans, in the field of view. For example, it is possible to distinguish occupant head size and orientation by reference to the different responses obtained by dynamically adjusting the electrode configuration. This information can then be used to further refine airbag system deployment characteristics.

Figure 21:
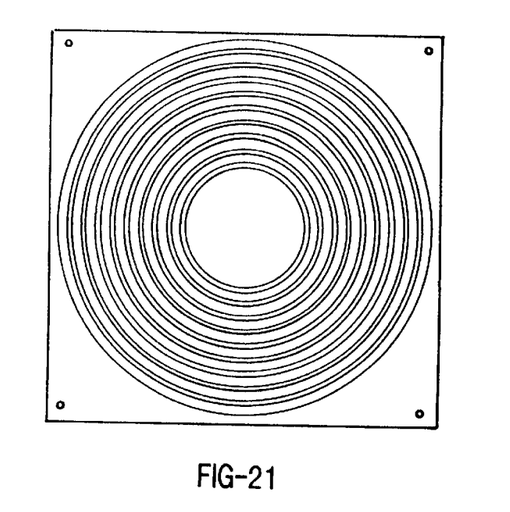
FIG. 21 is a plan view of a variable-geometry circular sensor of the invention.

A variable-geometry circular sensor is shown in FIG. 21. In this design, the nine rings can be sequentially configured as drive electrode, grounded gap, or inner receive electrode, to arrive at 727 different possible configurations of drive electrode, gap, and receive electrode. The principles involved in a round variable-geometry sensor can apply to most sensor geometries, whether circular, "breadloaf", square, or polygon in shape. Electrodes can be homogeneous or non-homogeneous.

Figure 15:
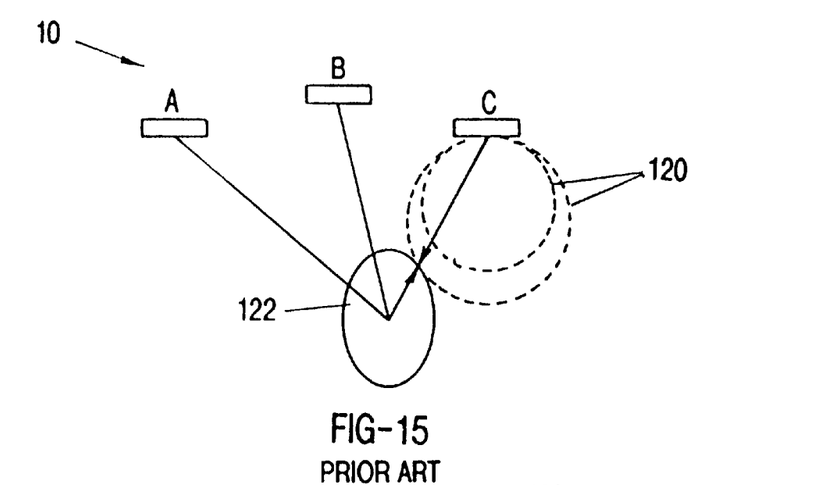
FIG. 15 illustrates head orientation and sizing using a three-sensor detector array.
Figure 16:
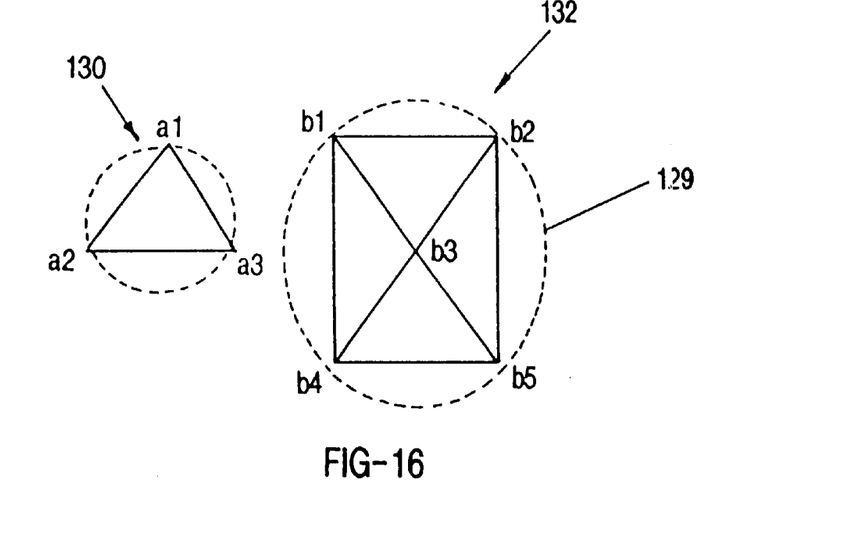
FIG. 16 illustrates head orientation and sizing using three-sensor and five-sensor detector arrays.
Figure 17:
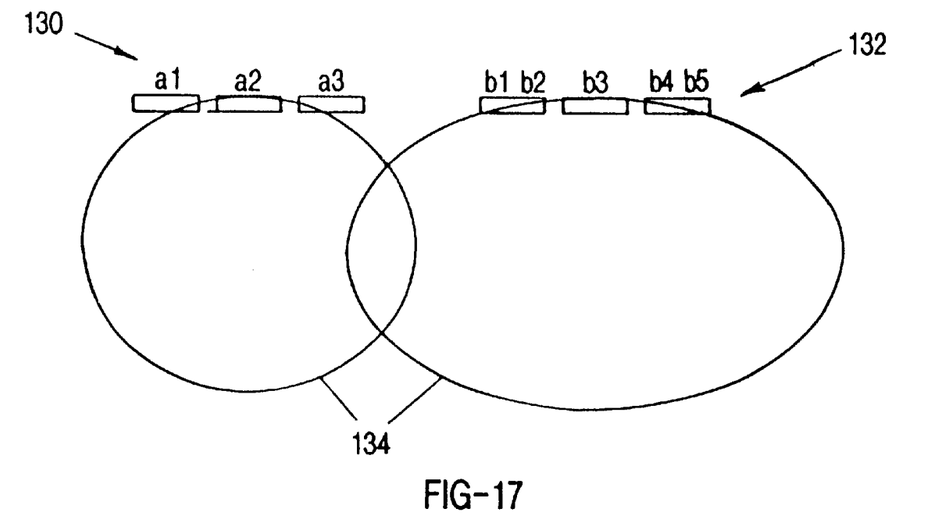
FIG. 17 is a side view of the arrays of FIG. 16.
Figure 18:
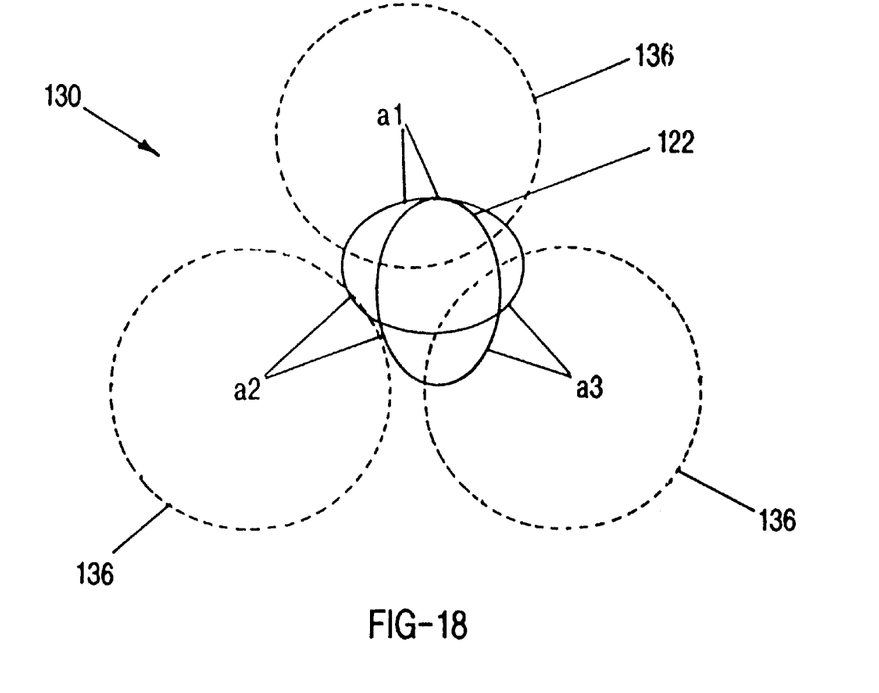
FIG. 18 is an illustration of use of a three-detector array to detect head orientation and size.
Figure 19:
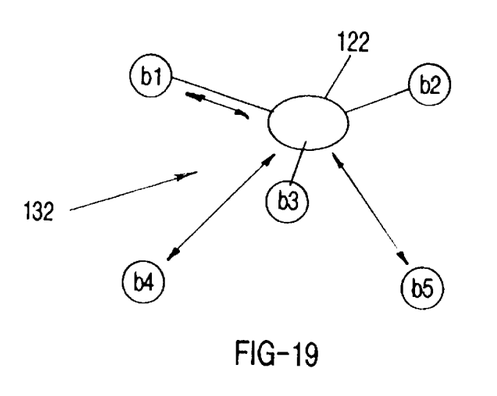
FIG. 19 is an illustration of use of a five-detector array to detect head orientation and size.
Figure 23:
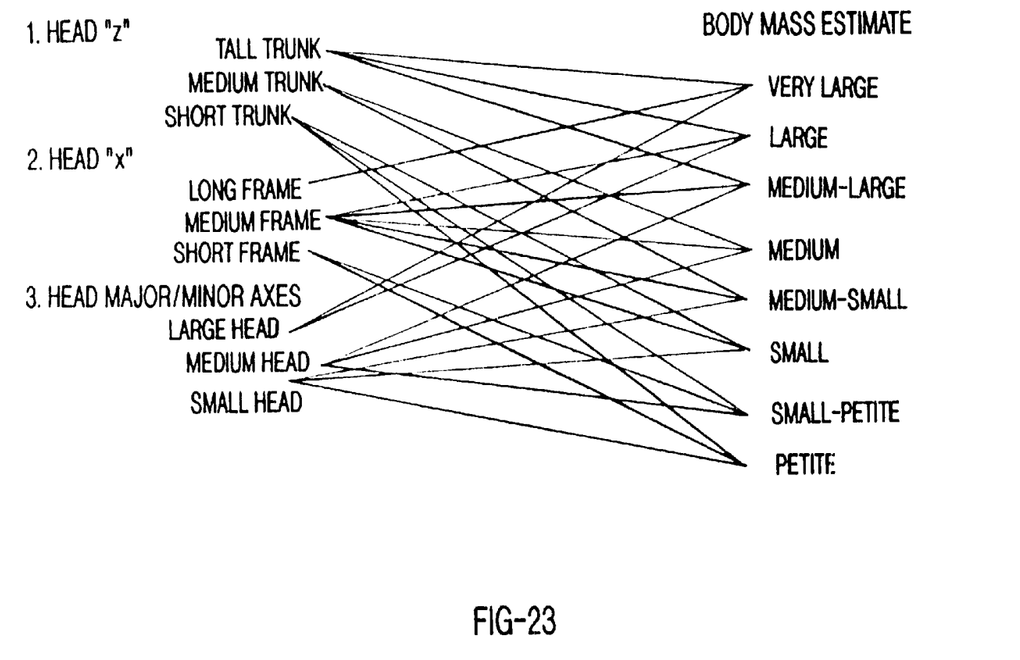
FIG. 23 is an illustrative decision tree to determine total body mass from detected head size.

Fringe field capacitance sensors can determine proximity to the head by reference to transfer functions relating voltage to proximity for the specified object, in this case a spherical water-filled object of about 7" diameter. Determination of proximity from three or more sensors allows computation of x,y,z coordinates using trigonometric functions. Referring to FIG. 15, because fringing fields 120 generated by sensors of detector array 10 are surface phenomena, the method initially uses an estimated head diameter of 3.5" to derive the "electronic center" of the head 122. In side view, this is depicted in FIG. 15. Triangulation requires the head to be within the range of the most distant detector. By introducing more detectors, a larger array expands the triangulation volume, depicted in FIG. 16 as an oval 129 encompassing the points of all possible triangles of the five detectors b1 through b5. FIG. 17 depicts in side view the effective volume 134 for determining head x,y,z coordinates generated by the three-sensor and five-sensor arrays 130 and 132 of FIG. 16. In that an oval shaped head is being sensed using overlapping hemispheric fields, determination of head orientation is possible. Additional capabilities include determination of approximate head diameter and major/minor axes, using arrays with more than three sensors. Depicted in FIG. 18 are overlapping hemispheric fringing fields 136 intersected by the oval head 122. As the head changes orientation, x-y coordinate values are affected. To simplify matters, a three-detector array 130 is shown in FIG. 18, but more sensors would preferably be used. Iteration of position from four or more detectors can derive a good estimate of head diameter. This capability is depicted with a five sensor array 132 in FIG. 19 (double arrow is for the second iteration). A system according to present invention can further provide a reasonable approximation of body mass by reference to x,y,z coordinates of the head and head major and minor dimensions. An exemplary decision tree for estimating mass is provided by FIG. 23.

Capacitive sensing systems operate electronically, and thus are able to detect many occupant positions in a short period of time. This capability is far in excess of the desired response time, and in fact can cause improper toggling of the safety system by triggering the system on or off more frequently than desired. A time delay circuit is provided to slow down the response of the sensor system, reducing the likelihood of unwanted on/off conditions. Accordingly, it is desirable to modify the response of a roof-mounted capacitive coupling occupant sensor so the sensor responds to the average position of the occupant rather than the instantaneous position.

The electronics circuitry of the present invention preferably includes a timer device (in the preferred embodiment, an astable multivibrator) which activates the toggle condition only if the condition still exists after the predetermined time delay has expired. If the toggle condition no longer exists, the system remains in its original state. Any timer which is small, lightweight, accurate, and preferably inexpensive can be used for this function.

While the present invention is primarily useful for sensing a vehicle occupant's presence and position, particularly of the occupant's head, which is closest to the roof-mounted sensor array, and for using this information to enable, disable, or modify the deployment of an airbag system, the invention is useful in a number of other ways. One such application is taught in parent application Ser. No. 08/535,576. Briefly, this invention utilizes sensor output to detect head nodding and other head motion which correlates to sleepiness of a driver, and then to activate an alarm to alert the driver as well as operators of other nearby vehicles to possible danger from the condition. As may be readily understood, the sensor array may be dedicated to a single function (e.g., airbag disabling/enabling or sleepiness detection), or to multiple functions (e.g., both airbag and sleepiness detection functions).

Other useful applications that may be achieved concurrently include: In the case of head injuries caused by accidents, neurological diagnosis would be enhanced by a record of head acceleration. The present invention is able to detect and record head acceleration at intervals of 1 msec or faster, providing useful data to the neurologist. Data on presence or absence of an occupant in each seating position permits broadcast of the total number of passengers in the motor vehicle. This is useful to report the number of passengers to authorities in the event of an accident or to verify total passenger count of vehicles traveling in the "high occupancy lane" of divided highways, such as found in the Washington, D.C., metropolitan area. Passenger data can also be used to balance and control the various heating, cooling, and sound systems in motor vehicles.

While private passenger vehicles are most valuably served by the sensing technology of the present invention, similar applications may be found in public transportation, such as to determine the number of occupied versus empty seats on a bus, train, plane, or other rapid transit vehicle. This data can be further enhanced to provide revenue verification by recording the seat occupancy and storing appropriate rates or tariffs for the travel segment in a data processor. In an airplane, through-passenger count can be recorded automatically for multi-stop flights.

Regarding the comfort and convenience for an individual occupant, especially for the vehicle operator, the head position can be used to automatically adjust side-mirrors which may be out of reach of the occupant, as in a large truck. Also, if the head position is determined in three axes, this data can be conveyed to a seat headrest adjustment unit to insure that it is at the proper height to protect against whiplash in the event of an impact. While three-axis determination is optimum for this application, a single or two-axis determination using output from one or two sensors may be employed. The same capability may be used to automatically adjust the entire seat position, raising the seat and moving it forward for a smaller occupant, or vice-versa for a larger occupant. The seat position would still be individually controllable, however, allowing the occupant to fine-tune position for best overall comfort for that individual.

Another valuable application of the sensing system is to electronically link driver presence to the ignition switch, to create an additional layer of protection against vehicle theft. In this embodiment, a person entering and occupying the driver's seat without inserting a key in the ignition within some appropriate time period would activate a theft alarm, and could disable engine electronics to prevent starting of the vehicle. This feature provides an added level of theft protection, in addition to those presently available which detect bypassing of the door key or door lock codes.

For commercial truck operators, tracking driver presence over time, based on detecting head presence and position, can be a means of assessing employee productivity, such as time driving versus not driving, or can be used to detect excessive time behind the wheel, contrary to "hours of continuous service" regulations for long-haul truckers. In the military, there are conditions in which the equipment operator is required to use optical sighting devices for target acquisition, while traveling at high speed over rough terrain. The head motion of the equipment operator and the fixed position of the sighting device may come into conflict, resulting in various failure modes. The present invention may be employed to automatically adjust the position of the optical sighting device using the head x,y,z, coordinates determined by the sensor array and processing circuitry.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding applications, are hereby incorporated by reference.

What is claimed is:

1. A method of disabling an airbag system for a seating position within a motor vehicle, the airbag system comprising an airbag door, the method comprising the steps of:

a) providing to a roof above the seating position one or more capacitive coupling occupant sensors;

b) detecting presence or absence of an occupant of the seating position using the one or more capacitive coupling occupant sensors;

c) disabling the airbag system if the seating position is unoccupied;

d) detecting proximity of an occupant to the airbag door if the seating position is occupied; and e) disabling the airbag system if the occupant is closer to the airbag door than a predetermined distance.

2. The method of claim 1 additionally comprising the step of modifying airbag deployment parameters to adjust inflation force of the airbag according to proximity of the occupant to the airbag door.

3. The method of claim 1 wherein the providing step comprises providing two capacitive coupling sensors, and the detecting proximity step comprises the steps of providing voltage output values of the capacitive coupling sensors to a data processor and comparing the voltage output values against predetermined values to determine occupant position.

4. The method of claim 1 wherein the providing step comprises providing one capacitive coupling sensor forward of a midpoint of the seating position and one capacitive coupling sensor aft of the midpoint.

5. An apparatus for disabling an airbag system for a seating position within a motor vehicle, the airbag system comprising an airbag door, the apparatus comprising:

one or more capacitive coupling occupant sensors proximate a roof above the seating position;

means for detecting presence or absence of an occupant of the seating position using said one or more capacitive coupling occupant sensors;

means for disabling the airbag system if the seating position is unoccupied;

means for detecting proximity of an occupant to the airbag door if the seating position is occupied; and means for disabling the airbag system if the occupant is closer to the airbag door than a predetermined distance.

6. The apparatus of claim 5 additionally comprising means for modifying airbag deployment parameters to adjust inflation force of the airbag according to proximity of the occupant to the airbag door.

7. The apparatus of claim 5 wherein said one or more capacitive coupling occupant sensors comprises two capacitive coupling sensors, and said means for detecting proximity comprises means for providing voltage output values of said capacitive coupling sensors to a data processor and comparing the voltage output values against predetermined values to determine occupant position.

8. The apparatus of claim 5 wherein the one of said capacitive coupling sensors is forward of a midpoint of the seating position and one of said capacitive coupling sensors is aft of the midpoint.

9. A motor vehicle air bag system for inflation and deployment of an air bag in front of a passenger in a motor vehicle during a collision, said motor vehicle having a passenger compartment for at least one passenger in said motor vehicle, said passenger compartment having an interior roof and a passenger seat for said passenger, said air bag system comprising:

an air bag;

inflation means connected to said air bag for inflating said air bag with a gas;

passenger sensor means, mounted adjacent to said interior roof, for continuously sensing position of said passenger with respect to said passenger compartment, and for generating electrical output indicative of said position of said passenger;

analog processor means, electrically connected to said passenger sensor means and to said inflation means, for comparing and performing an analysis of said electrical output from said passenger sensor means, and for activating said inflation means to inflate and deploy said air bag when said analysis indicates that said vehicle is involved in a collision and that deployment of said air bag would likely reduce a risk of serious injury to said passenger which would exist absent deployment of said air bag and likely would not present an increased risk of injury to said passenger resulting from deployment of said air bag.

* * * * *